J. BURROWS.
Needles.

No. 8,690. Reissued April 29, 1879.

Witnesses.

L. F. Connor.

N. E. Whitney.

Inventor

James Burrows, by Crosby & Gregory

Attys

N. PETERS, PHOTO-LITHOGRAPHER, WASHINGTON, D. C.

UNITED STATES PATENT OFFICE.

JAMES BURROWS, OF MANCHESTER, NEW HAMPSHIRE.

IMPROVEMENT IN NEEDLES.

Specification forming part of Letters Patent No. 209,018, dated October 15, 1878; Reissue No. 8,690, dated April 29, 1879; application filed December 14, 1878.

*To all whom it may concern:*

Be it known that I, JAMES BURROWS, of Manchester, in the county of Hillsborough and State of New Hampshire, have invented certain new and useful Improvements in Needles; and I do hereby declare that the following is a full, clear, and exact description of the invention, which will enable others skilled in the art to which it appertains to make and use the same, reference being had to the accompanying drawings, and to letters of reference marked thereon, which form a part of this specification.

The object of this invention is to provide means by which the attachment of buttons is greatly facilitated; and the invention consists in a needle flattened or shaped at its head, to be subsequently closed or clasped upon and embrace and hold the end of a thread firmly, in contradistinction to inserting the end of the thread through an eye, leaving the thread in a doubled state, or holding the thread by means of screw-threads.

The improved needle herein described is adapted to receive a very large thread, suitable for holding shoe-buttons or those having eyed shanks.

Figure 1:
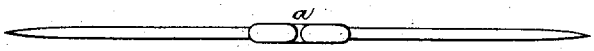
Figures 2, 3:
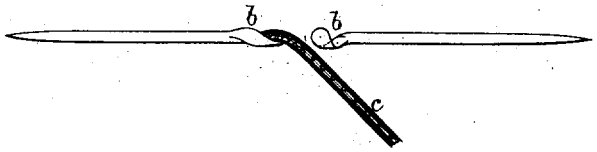

Figure 1 shows a blank for two needles, the ends of the blank being sharpened for the points of the needles, while the central portion of the blank is flattened to form the heels of the needles. Fig. 2 shows a single needle with its flattened or spread heel shaped to partially envelop the thread; and Fig. 3 represents the needle attached to the end of the thread, the flattened or spread heel or end of the needle being closed together about, and so as to clasp and hold, the end of the thread.

In constructing these needles the wire is commonly cut into lengths, each of which, when completed, will form two needles. Both ends of these blanks are then pointed, after which they may be placed under a drop-press and their ends flattened and separated, as shown at *a* in Fig. 1; or the blanks may be cut apart after being pointed, and their ends flattened upon an anvil by a hammer.

The next operation is to give the flat end of the needle a spiral twist, as shown at *b* in Fig. 2, by means of pliers or other mechanism. This prepares the needle for the reception of the thread, which is laid into the open end of the needle, after which the open heel is closed firmly upon the thread, as illustrated at Fig. 3, which represents the part *b* as closely embracing the thread *c*. This closing of the heel *b* of the needle upon the thread may be accomplished by means of a hammer and an anvil provided with a shallow groove in its face, in which groove the needle is placed and slightly rotated during the operation; or it may be performed more quickly in a drop-press provided with suitably-shaped dies, a single blow in this case being sufficient to secure the thread in place.

Many different methods might be used for constructing and applying these needles to the thread; but I prefer those above described, as being simple and requiring but small outlay for the necessary mechanism required to put the invention into use.

It will be observed that the thread used is substantially as large as the needle, it being proportioned to the size of the eyes in the buttons, so that a single thread may substantially fill the eye, thus making it necessary to pass the needle but once through the eye of each button.

I claim—

As an improved article of manufacture, a needle having an opened flattened heel adapted to receive and be clasped upon and about the end of a thread, substantially as described.

JAMES BURROWS.

Witnesses:

CATHERINE MEAD,

CHARLES A. O'CONNOR.